US010239642B1

(12) United States Patent
Spence et al.

(10) Patent No.: US 10,239,642 B1
(45) Date of Patent: Mar. 26, 2019

(54) HINGE AND LOCK MECHANISM FOR ROLL-OUT SOLAR ARRAY

(71) Applicant: Deployable Space Systems, Inc., Goleta, CA (US)

(72) Inventors: Brian R. Spence, Solvang, CA (US); Stephen F. White, Ventura, CA (US)

(73) Assignee: Deployable Space Systems, Inc., Goleta, CA (US)

( * ) Notice: Subject to any disclaimer, the term of this patent is extended or adjusted under 35 U.S.C. 154(b) by 210 days.

(21) Appl. No.: 15/082,058

(22) Filed: Mar. 28, 2016

(51) Int. Cl.
*B64G 1/44* (2006.01)
*B64G 1/22* (2006.01)
*H02S 30/20* (2014.01)
*H02S 10/40* (2014.01)

(52) U.S. Cl.
CPC ........... *B64G 1/443* (2013.01); *B64G 1/222* (2013.01); *H02S 10/40* (2014.12); *H02S 30/20* (2014.12)

(58) Field of Classification Search
CPC ......... B64G 1/443; B64G 1/222; H02S 10/40; H02S 30/20
See application file for complete search history.

(56) References Cited

U.S. PATENT DOCUMENTS

| | | | | | |
|---|---|---|---|---|---|
| 4,155,524 | A | * | 5/1979 | Marello | B64G 1/443 136/245 |
| 5,620,529 | A | * | 4/1997 | Bassily | B64G 1/222 136/245 |
| 8,894,017 | B1 | * | 11/2014 | Baghdasarian | B64G 1/443 136/245 |
| 2005/0178921 | A1 | * | 8/2005 | Stribling | B64G 1/222 244/172.7 |
| 2007/0094847 | A1 | * | 5/2007 | Thomson | B64G 1/222 16/369 |

* cited by examiner

*Primary Examiner* — Devina Pillay
(74) *Attorney, Agent, or Firm* — R. Scott Kimsey, Esq.; Klein DeNatale Goldner (57) ABSTRACT

A roll-out solar array includes a first mandrel having first and second ends and a second mandrel having first and second ends. A hinge extends between the first and second mandrels, such that the roll-out solar array can transition between a stowed position where the mandrels are in a substantially parallel configuration and a deployed position where the mandrels are in a series configuration. A latch may be provided to lock the roll-out solar array in the stowed configuration.

1 Claim, 8 Drawing Sheets

HINGE AND LOCK MECHANISM FOR ROLL-OUT SOLAR ARRAY

RELATED APPLICATIONS

Not Applicable.

BACKGROUND

1. Field

The disclosed device relates generally to the field of solar arrays for space-based applications, and more specifically to a hinge and lock mechanism for a roll-out solar array.

2. Background

The term solar array, as defined herein, pertains to a structure that is stowable in a small volume for shipment and launch, and that is deployable when in space to expose a large surface area of photovoltaic collectors (solar cells) to the sun, and that is attached to certain spacecraft vehicles to provide power for spacecraft operations.

Solar arrays typically consist of an underlying structure for deployment of a substantial number of individual photovoltaic solar cells from the body of the a spacecraft. Once fully deployed, it is desirable for the solar array structure to provide a lighweight, stiff, strong, stable and flat platform for the solar cells to allow uniform exposure to the sun and minimize on-orbit spacecraft attitude control disturbance loads. Solar arrays are typically stowed such that they are constrained in a small envelope prior to and during launch of the spacecraft and then are deployed to their fully-extended configuration, exposing the maximum area of solar cells once the spacecraft has reached its position in space. It is desirable to minimize the volume of the stowed package while at the same time maximizing the available solar cell area that can be packaged when stowed, and subsequently deployed to allow for maximum power production for the spacecraft.

Developments in solar array technology have led to simplified solar arrays with reduced complexity and fewer mechanical parts as compared to the devices that came before. The complex solar-array mechanisms are replaced with an ultra-lightweight, tubular rolled boom structural element that elastically self-deploys under its own strain energy, and is directionally-controlled such that it deploys in a known, unidirectional manner without the need for heavy, complex auxiliary actuators to assist deployment or add deploy force. The boom structural element of these devices does not require hinges, dampers, complicated synchronization mechanisms, brakes, or motors for deployment, and do not have the parasitic mass associated with the mechanisms typically required by previous solar array structures to achieve high deployment force margins. Because the boom structure self-deploys elastically via its own high internal strain energy, it does not require passive (solar) or active (via powered heaters) heating of the boom material to actuate deployment, and provides its own internally-generated high deployment force. The available strain energy for conducting deployment can be maximized to achieve the desired deployment force margin by the use of a highly unidirectional thin fiber-composite layup material for the roll-out boom, because the boom component of the device is directionally-controlled to always unroll in a known and predictable direction, without requiring a special (lower deployment force) bi-stable elastic laminate or elastic memory composite (EMC) material.

The roll-out solar array device described above enables uniform stowage and secure packaging of a fragile solar-cell populated flexible blanket by maintaining a decoupled arrangement between the blanket longitudinal edges and the deployment structural elements, allowing either a rolled flexible photovoltaic blanket, or an accordion Z-folded flat-package arrangement to be implemented when stowed. Either simultaneous or independent deployment of the boom structure and flexible blanket is allowed.

The elastic deployable boom of a roll-out solar array may include one or more elastic roll out booms. Each roll out boom is a thin-wall, tubular, elongated structure having a first end, a second end opposite the first end, and a longitudinal axis. The boom system has a boom mandrel, a root support, and deployment control mechanisms. The boom mandrel is a substantially cylindrical structure with a longitudinal axis as well as supporting structure operable for allowing the mandrel to rotate about the longitudinal axis of the boom mandrel. The root support structure provides a fixed base for deployment of each of the elastic roll-out booms.

SUMMARY

A roll-out solar array includes a first mandrel having a length extending between a first and second end thereof. The first mandrel is substantially cylindrical and has a longitudinal axis upon which the first mandrel is able to rotate. A second mandrel is provided, the second mandrel having a length extending between the first and second ends thereof. The second mandrel is substantially cylindrical and has a longitudinal axis upon which the second mandrel is able to rotate. A hinge is attached to the first end of the first mandrel and the first end of the second mandrel and extends therebetween. The roll-out solar array has a first, stowed configuration and a second, deployed configuration. When in the stowed configuration, the first mandrel and second mandrel as positioned in parallel arrangement to form a compact structure. When in the deployed configuration, the first mandrel and second mandrel are positioned in series, the articulation of the hinge allowing transition between the stowed and deployed configuration.

The roll-out solar array may further include a first elastic roll-out boom. The first elastic roll-out boom has a plurality of configurations, ranging from a stowed configuration wherein the elastic roll-out boom is rolled onto the first mandrel, to a deployed configuration wherein the first elastic roll-out boom is fully extended. The first elastic roll-out boom has a first end and a second, opposing end, and a longitudinal axis is defined between the first and second ends of the first elastic roll-out boom when the first elastic roll-out boom is in the deployed configuration. A second elastic roll-out boom may be provided having a plurality of configurations ranging from a stowed configuration wherein the second elastic roll-out boom is rolled onto the second mandrel, to a deployed configuration wherein the second elastic roll-out boom is fully deployed. The second elastic roll-out boom has a first end and a second, opposing end, and a longitudinal axis is defined between the first and second ends when the second elastic roll-out boom is in the deployed configuration.

The roll-out solar array may further include a first root support structure having a first end and an opposing second end. The first root support structure is attached to the first elastic roll-out boom. A second root support structure may be provided having a first end and a second, opposing end. The second root support structure is attached to the second elastic roll-out boom. A second hinge may be attached to the first end of the first root structure and the first end of the second root structure. The second end is configured to articulate so as to allow transition of the roll-out solar array between the stowed and deployed configurations.

The roll-out solar array may further include a first fastener attached to the first end of the first mandrel and a second fastener attached to the first end of the second mandrel, the first fastener configured to engage the second fastener when the roll-out solar array is in the deployed configuration, thereby locking the roll-out solar array in the deployed configuration.

The roll-out solar array may further include a first fastener attached to the first end of the first root support structure and a second fastener attached to the first end of the second root support structure, the first fastener configured to engage the second fastener when the roll-out solar array is in the deployed configuration, thereby locking the roll-out solar array in the deployed configuration.

The roll-out solar array may further include a fastener release, wherein actuation of the fastener release causes the first fastener to disengage from the second fastener.

The roll-out solar array may further include a latch fixedly attached to the second root support structure and releasably attached to the first root support structure. When the latch is engaged with the first root support structure, the roll-out solar array is locked in the stowed configuration.

The roll-out solar array may further include a latch release for disengaging the latch from the first root support structure.

The latch release may include a rotatable handle.

The roll-out solar array may include a third hinge attached to the first end of the first root support structure and the first end of the second root support structure. The third hinge may be configured to articulate so as to allow transition of the roll-out solar array between the stowed and deployed configurations.

Another embodiment of a roll-out solar array may include a first rolled photovoltaic blanket attached to a first support structure, and a second roll-out photovoltaic blanket attached to a second support structure. A hinge may extend between the first support structure and the second support structure. The roll-out solar array is movable between a first, stowed configuration where the first photovoltaic blanket and the second photovoltaic blanket are positioned in substantially parallel arrangement, and a second, deployed configuration where the first photovoltaic blanket and second photovoltaic blanket are positioned in series arrangement. The hinges articulates so as to allow transition of the roll-out solar array between the stowed and deployed configurations.

DETAILED DESCRIPTION

Definitions

The term "solar array" means a structure that is stowable in a small volume for shipment and launch, and that is deployable when in space to expose a large surface area of photovoltaic collectors (solar cells) to the sun, and that is mechanically and electrically attached to a spacecraft vehicle to provide power for spacecraft operations.

The term "flexible solar array" means a solar array that includes a rollable or foldable thin flexible blanket or substrate to which the solar cells are mounted.

The term "roll out boom" means a thin-walled metallic or composite reinforced slit-tube (open section) or closed section hollow structural member. One or more booms can be used as the primary longitudinal deployment and deployed structural member of the solar array. The thin-walled elastic nature of the booms allows them to be flattened and rolled up into an extremely compact stowage volume.

The term "elastic roll out boom" means a roll out boom that is constructed such that it is self-deploying elastically through its own internal strain energy and remains in the elastic state when rolled up. The elastic roll out boom does not require passive heating or active heating on the structural tubular member to actuate deployment, and provides its own sufficiently high deployment force. The available strain energy for conducting deployment may be maximized to achieve the required deployment force margin by the use of a primarily unidirectional thin fiber-composite lamiante.

The term "deployment control" means a method of restraining when rolled, and deploying an elastic boom with a longitudinally-oriented unidirectional thin composite layup so it unrolls in a known and predictable direction, with maximum deployment torque, and without requiring a special (lower deployment force) bi-stable elastic laminate or elastic memory composite (EMC) material.

The term "directionally-controlled elastic roll out boom" means a roll out boom that is constructed such that it is self-deploying elastically through its own internal strain energy, remains in the elastic state when rolled up, and is directionally-controlled by incorporating one or more methods of deployment control so it unrolls in a known and unidirectional manner.

The term "mandrel" means a hollow, lightweight tube onto which the roll out booms and/or the planar flexible PV blanket is rolled for compact stowage.

The term "photovoltaic (PV) blanket means a thin, flexible substrate that has mounted to it an array of photovoltaic solar cells and associated wiring that can be rolled or folded into a small package for stowage, and which is attached to the deployable solar array structure (except for longitudinal booms) for unfurling into a flat, tensioned configuration during deployment.

Figure 1:
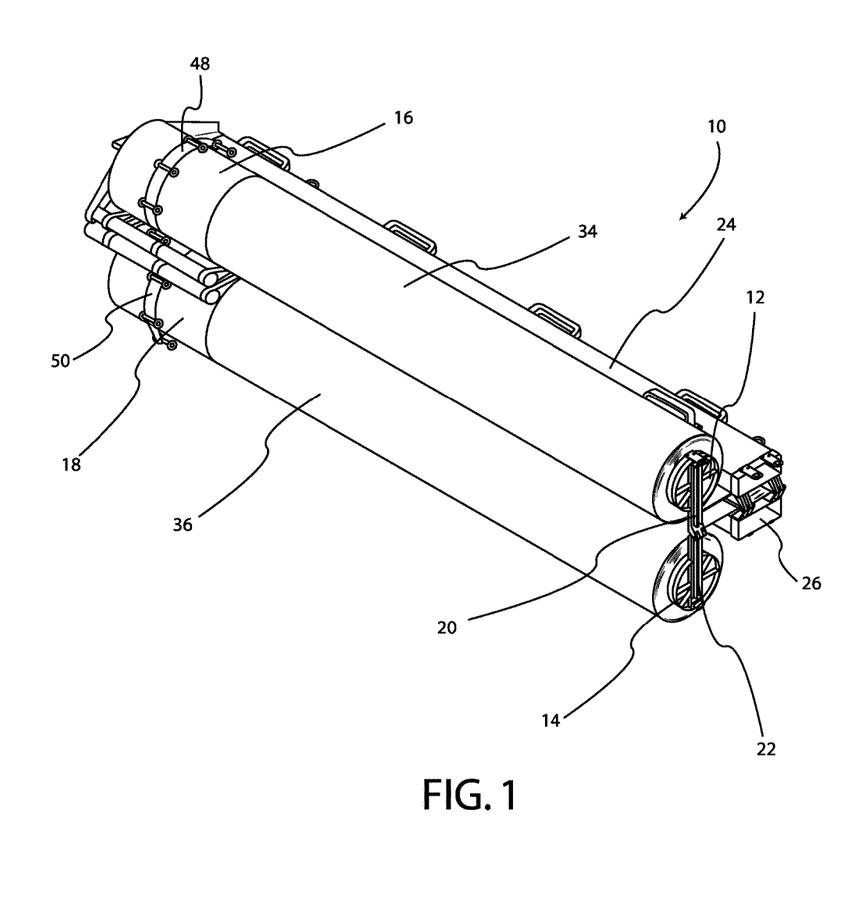
FIG. 1 is a perspective view of one embodiment of a hinged roll-out solar array.

Turning to the figures, wherein like numerals indicate like parts, FIG. 1 is a perspective view of a roll-out solar array 10 having a hinge and lock mechanism according to the present teachings. Roll-out solar array 10 includes a first mandrel 12, a second mandrel 14, a first elastic roll-out boom 16, and a second elastic roll-out boom 18. First roll-out boom 16 is depicted rolled around first mandrel 12, while second elastic roll-out boom 18 is depicted rolled around second mandrel 14. Also shown in FIG. 1 are a first root support structure 24 and second root support structure 26. A first hinge 20 extends between first mandrel 12 and second mandrel 14. A second hinge 22 and a third hinge 38 extend between first root support structure 24 and second root support structure 26. First elastic roll-out boom 16 and second elastic roll-out boom 18 are prevented from deploying by first boom containment structure 48 and second boom containment structure 50, respectively.

First mandrel 12 includes a first Integrated Modular Blanket Assembly (IMBA) 34 rolled therearound. Likewise, second mandrel 14 has a second IMBA 36 rolled therearound. IMBAs 34 and 36 provide an ultra-thin, efficient, multi-junction solar cell assembly along with interconnected strings/circuits. IMBAs 34 and 36 represent one potential flexible photovoltaic (PV) blanket assembly suitable for use with the roll-out solar array structure depicted in FIG. 1. It is contemplated that any suitable flexible solar array or flexible PV blanket may be used in association with the roll-out solar array structure shown in FIG. 1.

First elastic roll-out boom 16 and second elastic roll-out boom 18 are rolled around first mandrel 12 and second mandrel 14, respectively. Structural deployment of IMBAs 34 and 36 is motivated by the elastic strain energy of elastic roll-out booms 16 and 18, respectively. First mandrel 12 and second mandrel 14 may consist of hollow, lightweight tubes onto which the roll-out booms and IMBAs are rolled. IMBA 34 is attached to the roll-out solar array structural subsystem at both mandrel 12 and first root support structure 24, along the respective lengths of these structures, and may be attached rigidly or with longitudinally-oriented blanket springs that allows IMBA 34 to roll up at the same rate and diameter as elastic roll-out boom 16, and to be under tension when fully deployed. IMBA 36 is similarly attached to both second mandrel 14 and second root support structure 26.

A first articulating hinge 20 is shown in FIG. 1, with a first end of first hinge 20 attached to first mandrel 12 and a second end of hinge 20 attached to second mandrel 14. A joint is formed in first articulating hinge 20 at approximately midway along the length of first hinge 20, and first mandrel 12 and second mandrel 14 are capable of movement about that joint. A second articulating hinge 22 is shown extending between first root support structure 24 and second root support structure 26. Third articulating hinge 38 also extends between the first root support structure 24 and the second root support structure 26 in the same manner as second articulating hinge 22. The first, second, and third hinges 20, 22, and 38, allow movement of each half of roll-out solar array 10 about the respective joints, with each half of roll-out solar array 10 comprising a mandrel, IMBA, elastic roll-out boom, and root support structure, among other structures further described below.

Figure 2:
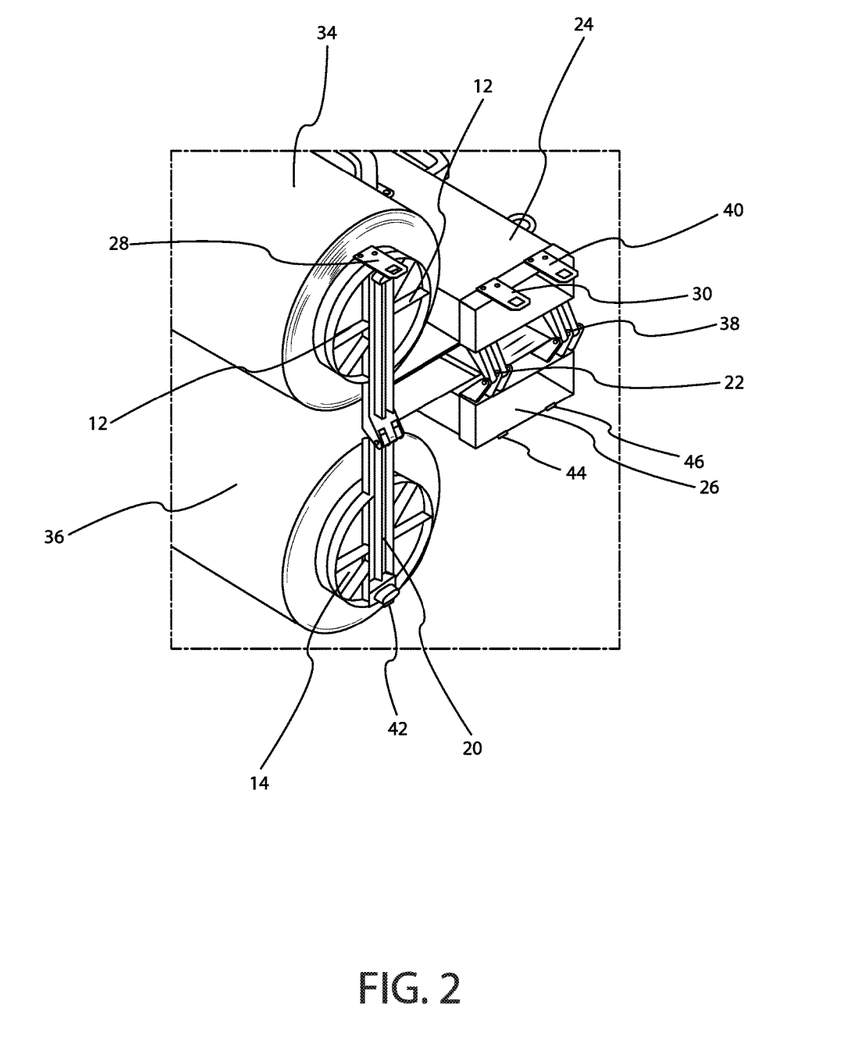
FIG. 2 is a close view of hinge structures associated with one embodiment of a hinged roll-out solar array.

FIG. 2 provides a close view of the hinge mechanism and other components of the roll-out solar array depicted in FIG. 1. FIG. 2 also provides a better illustration of the rolled nature of IMBAs 34 and 36, which are shown rolled onto first mandrel 12 and second mandrel 14, respectively. The extension of first hinge 20 between first mandrel 12 and second mandrel 14 is shown, as is first fastener 28, on first mandrel 12. Second fastener 30 and third fastener 40 are shown attached to first root support structure 24, with portions of each of the fasteners extending beyond the edge of the mandrel or root support structure to which the fasteners are attached. Fourth, fifth, and sixth fasteners 42, 44, and 46 are configured to engage fasteners 28, 30, and 40, respectively. When the two halves of roll-out solar array 10 are rotated about the joints of hinges 20, 22, and 38, such that first mandrel 12 and second mandrel 14 are positioned in series, and first root support structure 24 and second root support structure 26 are also positioned in series, first, second, and third fasteners 28, 30, and 40 engage with respective fourth, fifth, and sixth fasteners 42, 44, and 46 to lock roll-out solar array 10 in the "deployed" configuration. Operation of the various fasteners is shown and described in greater detail, below.

Figure 3:
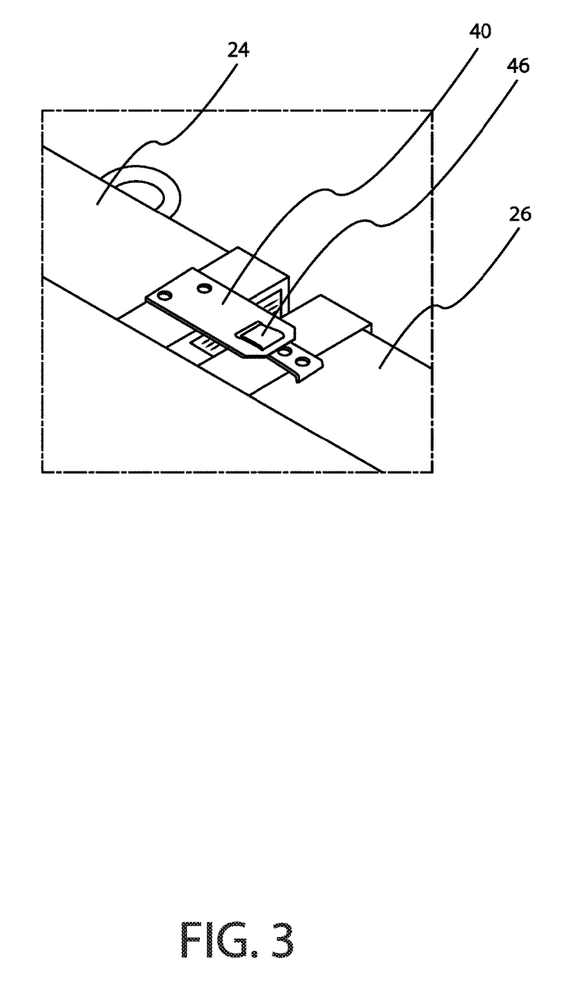
FIG. 3 is a close view of a fastening mechanism associated with one embodiment of a hinged roll-out solar array.

FIG. 3 provides a close view of one of the fastener combinations shown in FIGS. 1 and 2. As shown, third fastener 40 engages sixth fastener 46 to lock roll-out solar array 10 into a deployed position. First fastener 40 includes an opening sized and shaped to receive a tab or protrusion constructed as part of sixth fastener 46. When roll-out solar array 10 is placed in the deployed configuration, the tab of sixth fastener 46 is received into the opening of third fastener 40, the two fasteners coming together to form a locked structure. The tab of sixth fastener 46 may include a lip portion that engages the edge of the opening in third fastener 40, thereby increasing the security of the lock when the roll-out solar array 10 is in the deployed position. It is contemplated that first fastener 28 and third fastener 42, as well as second fastener 30 and fifth fastener 44, mate in similar fashion. Although the fasteners shown in the figures utilize the tab-and-opening structure described here, it is contemplated that any suitable fastening mechanism may be used to retain roll-out solar array 10 in the deployed position.

Figure 4:
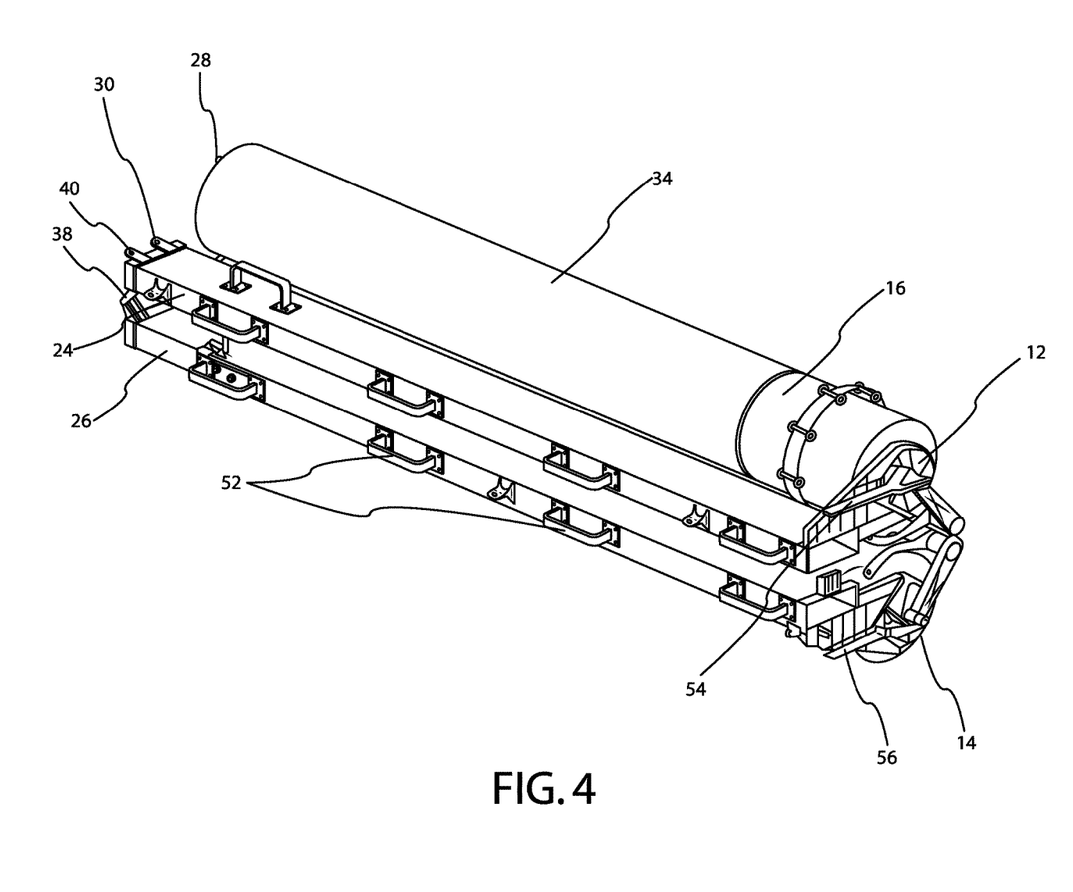
FIG. 4 is a perspective view of one embodiment of a hinged roll-out solar array.

FIG. 4 shows the roll-out solar array 10 of FIG. 1 from the opposing viewing angle. From this angle, IMBA 34 is visible, as are first roll-out boom 16 and first roll-out boom containment structure 48. First mandrel 12 and second mandrel 14, about which the IMBAs are rolled, are also shown. A plurality of extra-vehicular activity (EVA) handles 52 are shown attached to first root support structure 24 and second root support structure 26. EVA handles 52 allow for manipulation of roll-out solar array 10 in space, by astronauts wearing EVA suits. Such manipulations may include, for example, stowage removal, manipulation and transportation of the roll-out solar array structure, deployment of the roll-out solar array structure to full-width position, attachment of the roll-out solar array to a space station, satellite, or other structure, and manual release of the boom structure to initiate an elastic, non-motorized, non-command deployment of the roll-out solar array. It is contemplated, however, that some embodiments of roll-out solar array 10 may lack EVA handles 52.

FIG. 4 also depicts first and second manual deployment release levers 54 and 56. First and second manual deployment release levers 54 and 56 may be used to manually deploy IMBAs 34 and 36, respectively. Rotation of first manual deployment release lever 54 causes disengagement of first boom containment structure 48. Rotation of second manual deployment release lever 56 causes disengagement of second boom containment structure 50. With the boom containment structures disengaged, first elastic roll-out boom 16 and second elastic roll-out boom 18 deploy with no requirement for motors or electronic commands. Deployment of first and second elastic roll-out booms 16 and 18 results in a corresponding deployment of first and second IMBAs 34 and 36.

Figure 5A:
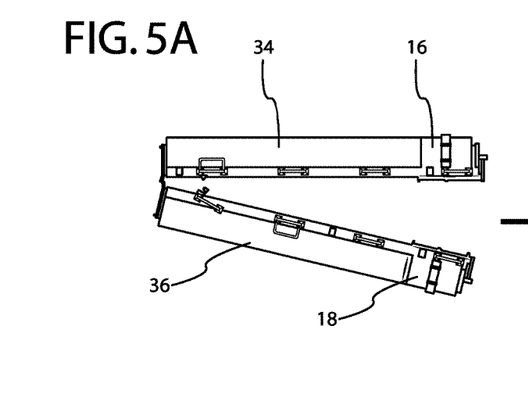
FIGS. 5A through 5C depict the transition of one embodiment of a hinged roll-out solar array from just after unlocking the stowed configuration to the deployed configuration.
Figure 5B:
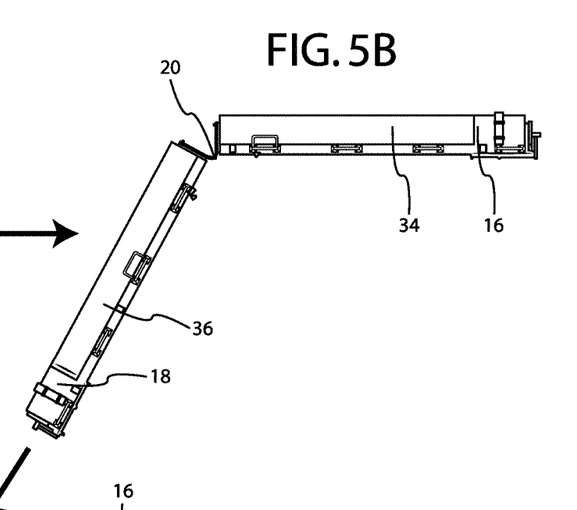
Figure 5C:
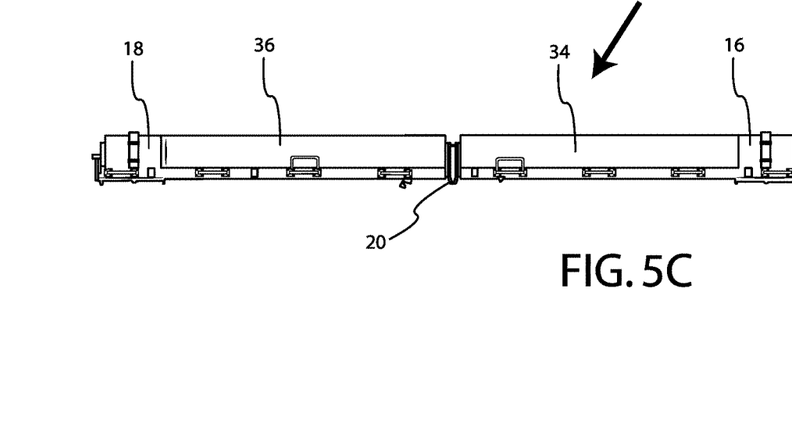

FIGS. 5A, 5B, and 5C depict a transition sequence in which roll-out solar array 10 moves from an unlocked configuration (which occurs following unlocking of the device when it is in stowed configuration as shown in FIG. 4), as shown in FIG. 5A, to a deployed configuration shown in FIG. 5C. FIG. 5B depicts an intermediate state between the stowed and deployed configurations. The unlocking of roll-out solar array 10, and its subsequent transition from the stowed to the deployed configuration, may be performed manually, as described in greater detail below.

Figure 6:
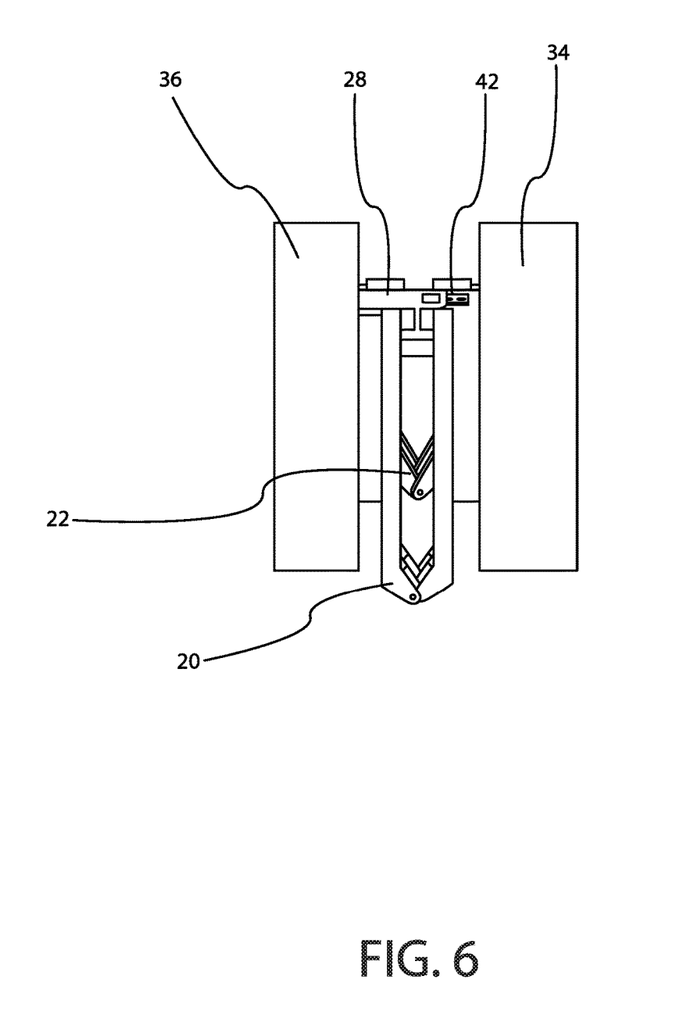
FIG. 6 is a close side perspective view of a locking mechanism of one embodiment of a roll-out solar array.

As noted above, when roll-out solar array 10 is placed in the deployed configuration, where IMBAs 34 and 36 are positioned in series, a locking mechanism is utilized to retain the roll-out solar array 10 in the locked position. As shown in FIG. 6, first fastener 28 and fourth fastener 42 engage, and if other fasteners as described above are used with roll-out solar array 10, those other sets of fasteners engage in a similar manner. Any suitable fastening mechanism may be utilized for this purpose. FIG. 6 also provides a view of first hinge 20 and second hinge 22, the former extending between first mandrel 12 and second mandrel 14, and the latter extending between first root support structure 24 and second root support structure 26.

Figure 7A:
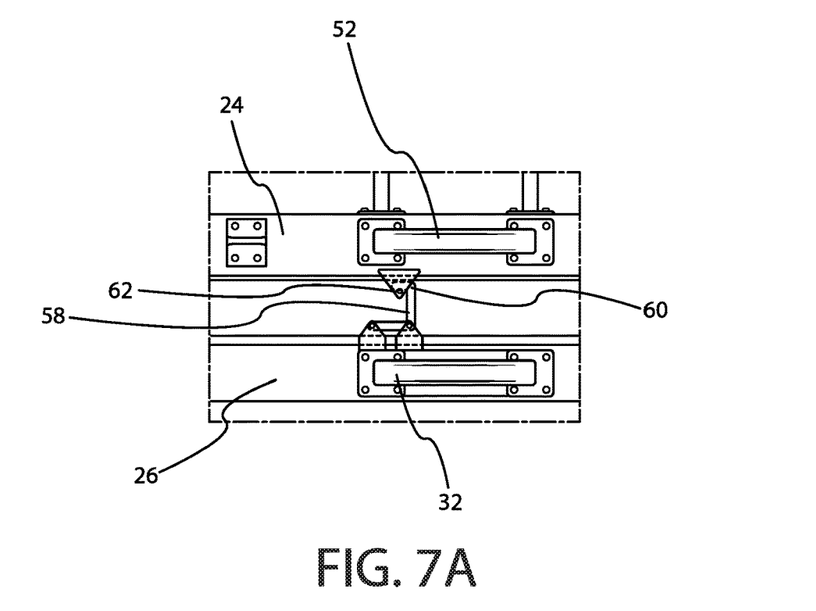
FIG. 7A is a close view of a latch mechanism of one embodiment of a roll-out solar array, the latch mechanism in the closed state.
Figure 7B:
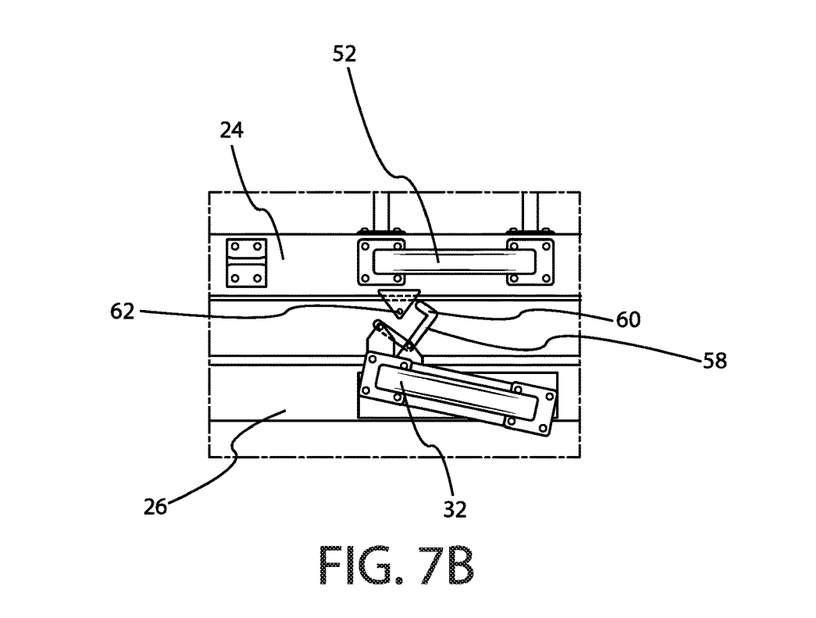
FIG. 7B is a close view of a latch mechanism of one embodiment of a roll-out solar array, the latch mechanism in the open state.
Figures 8A, 8B, 8C, 8D:
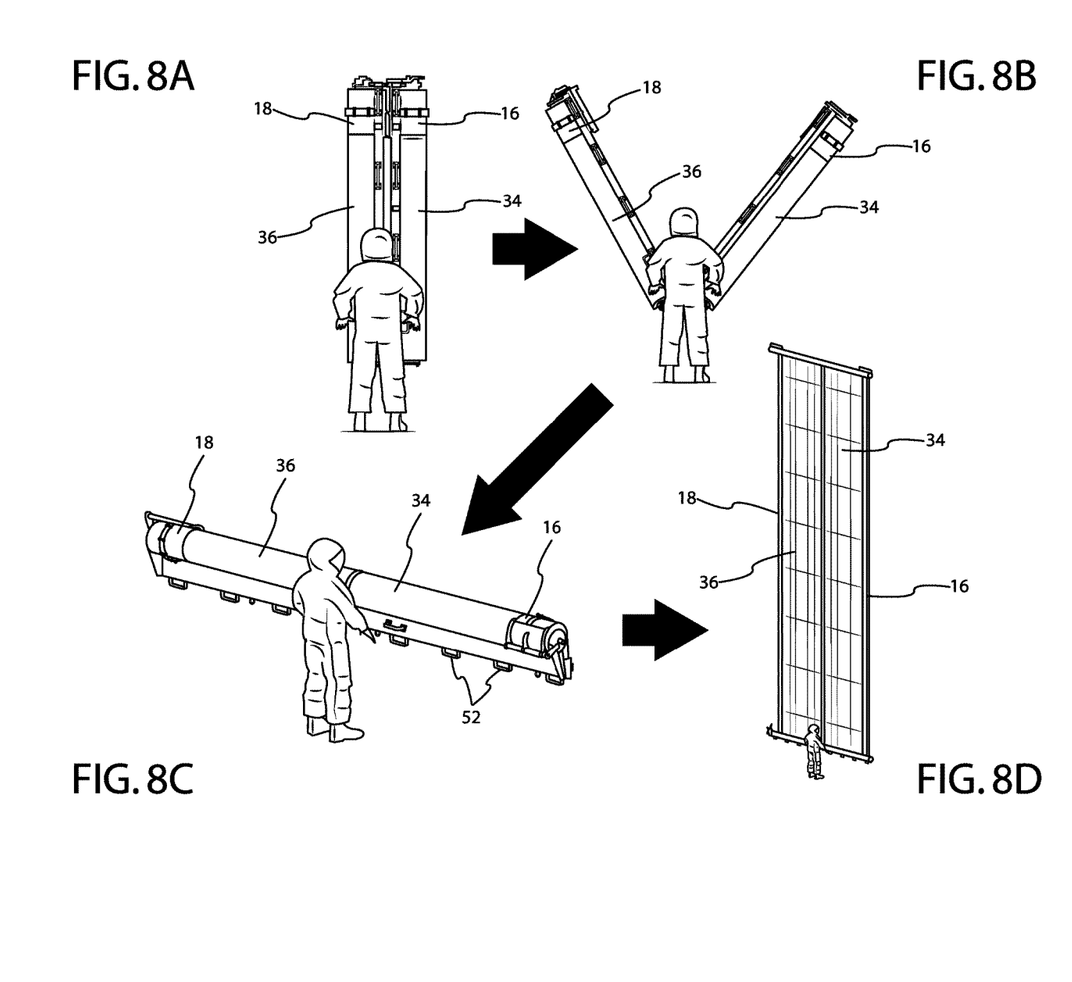
FIGS. 8A through 8D depict the transition of a roll-out solar array from a stowed configuration to a deployed configuration having a pair of fully-deployed IMBAs.

When roll-out solar array 10 is in stowed configuration, wherein the two halves of the solar array are substantially parallel, it is preferred that the two halves of roll-out solar array 10 be locked into position. The locking mechanism should be such that the two halves of roll-out solar array 10 can be disengaged when necessary or desirable to do so. One latch mechanism that may be used in conjunction with roll-out solar array 10 is shown in FIG. 7A. The latch mechanism in FIG. 7A includes a latch 58 that is fixedly attached to second root support structure 26. Latch 58 includes a hook portion 60 that engages and disengages an "eye" or bracket 62 fixedly attached to first root support structure 24. In the embodiment of the latch mechanism shown in FIG. 7A, latch 58 pivots in order to move between engaging and disengaging eye 62, and that pivoting motion is provided by rotation of latch release handle 32. When latch release handle 32 is rotated, there is a corresponding pivot of latch 58 that disengages hook 60 from eye 62, thereby allowing roll-out solar array 10 to be transitioned to the deployed configuration. FIG. 7B depicts the state of the latch mechanism after rotation of latch release handle 32 and disengagement of hook 60 from eye 62.

FIGS. 8A, 8B, 8C, and 8D depict a transition of roll-out solar array 10 from a stowed configuration, shown in 8A, to a deployed configuration, as shown in 8C, and then to having IMBAs 34 and 36 in a fully deployed state. As shown in the figures, the transition can be performed manually, such as by a user 64 in an extra-vehicular activity (EVA) suit when roll-out solar array 10 is deployed into space. When roll-out solar array 10 is in the position shown in FIG. 8A, user 64 actuates first manual deployment release lever 54 and second manual deployment release lever 56. This results in disengagement of first boom containment structure 48 and second boom containment structure 50 from first elastic roll-out boom 16 and second elastic roll-out boom 18, respectively. IMBAs 34 and 36 then undergo non-motorized, non-command-driven deployment as a result of the elastic strain energy of first elastic roll-out boom 16 and second elastic roll-out boom 18.

First elastic roll-out boom 16 and second elastic roll-out boom 18 self-deploy, elastically, under their own high internal strain energies. No passive (solar) or active (via powered heaters) heating of the boom material is required to actuate deployment. Each boom provides its own internally-generated high deployment force. The available strain energy for conducting deployment can be maximized to achieve the desired deployment force margin by the use of a highly unidirectional thin fiber-composite layup material for the roll-out boom, thus resulting in boom structures that are directionally-controlled to always unroll in a known and predictable direction, without requiring special (lower deployment force) bi-stable elastic laminate or elastic memory composite (EMC) material.

The elastic roll-out booms may be, for example, open section (slit tube) or closed section structures that allow flattening prior to and during rolling to enable a flat, rolled packaging onto each respective mandrel. The elastic roll-out booms may be constructed from a fiber-reinforced composite with a majority of the fibers directionally-oriented along the longitudinal axis of the roll-out boom, or they may be of metallic construction.

It is understood that while the roll-out solar arrays described above and shown in the drawings include elastic roll-out booms that self-deploy under their own strain energies, the hinge and lock mechanisms, latches, and the like disclosed herein may be adapted to provide a compact stowed configuration in a variety of deployable solar arrays. Further, while certain hinge, latch, or fastener mechanisms are shown and described herein, it is contemplated that any suitable hinge, latch, and/or fastener mechanisms may be used.

What is claimed and desired to be protected by Letters Patent includes the following:

1. A roll-out solar array comprising:
a first mandrel having a length extending between a first and second end thereof, the first mandrel being substantially cylindrical and having a longitudinal axis upon which the first mandrel is able to rotate;
a second mandrel having a length extending between a first and second end thereof, the second mandrel being substantially cylindrical and having a longitudinal axis upon which the second mandrel is able to rotate;
a first elastic roll-out boom having a plurality of configurations ranging from a stowed configuration wherein the first elastic roll-out boom is rolled onto the first mandrel to a deployed configuration wherein the first elastic roll-out boom is fully extended, the first elastic roll-out boom having a first end and a second, opposing, end wherein a longitudinal axis is defined between the first and second ends of the first elastic roll-out boom when the first elastic roll-out boom is in the deployed configuration; and
a second elastic roll-out boom having a plurality of configurations ranging from a stowed configuration wherein the second elastic roll-out boom is rolled onto the second mandrel to a deployed configuration wherein the second elastic roll-out boom is fully deployed, the second elastic roll-out boom having a first end and a second, opposing, end wherein a longitudinal axis is defined between the first and second ends of the second elastic roll-out boom when the second elastic roll-out boom is in the deployed configuration;
a first hinge attached to the first end of the first mandrel and the first end of the second mandrel and extending therebetween;

a first root support structure having a first end and an opposing second end, the first root support structure attached to the first elastic roll-out boom;

a second root support structure having a first end and an opposing second end, the second root support structure attached to the second elastic roll-out boom; and a second hinge attached to the first end of the first root support structure and a first end of the second root support structure, the second hinge configured to articulate in order to allow transition of the roll-out solar array between the stowed and deployed configurations;

a latch fixedly attached to the second root structure and releasably attached to the first root structure, such that when the latch is engaged with the first root structure the roll-out solar array is locked in the stowed configuration; and a latch release for disengaging the latch from the first root support structure, wherein the roll-out solar array has a first, stowed configuration and a second, deployed, configuration, further wherein when in the stowed configuration the first mandrel and second mandrel are positioned in parallel arrangement to form a compact structure, and when in the deployed configuration the first mandrel and second mandrel are positioned in series, the articulation of said hinge allowing transition between the stowed and deployed configurations of the roll-out solar array, and further wherein the latch release comprises a rotatable handle.

* * * * *